Jan. 8, 1952     J. G. CAPSTAFF     2,582,004
MOTION-PICTURE SENSITOMETRY
Filed Oct. 2, 1947
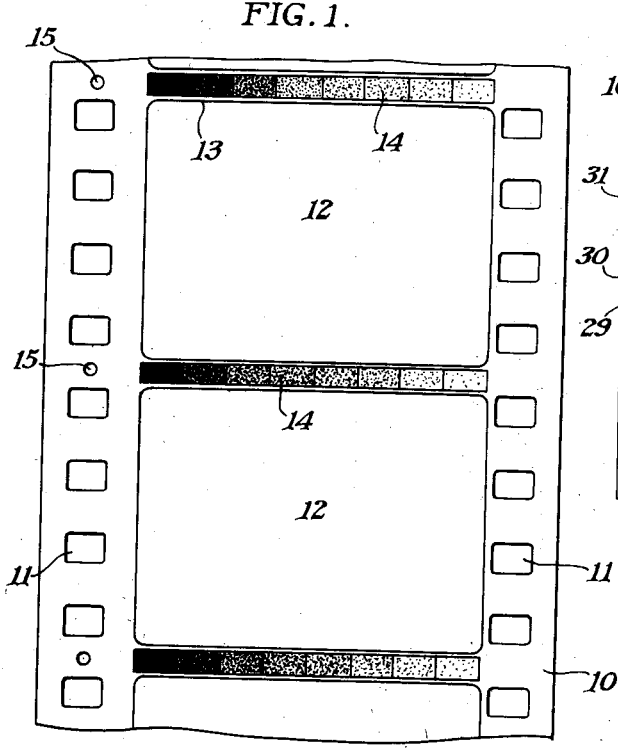
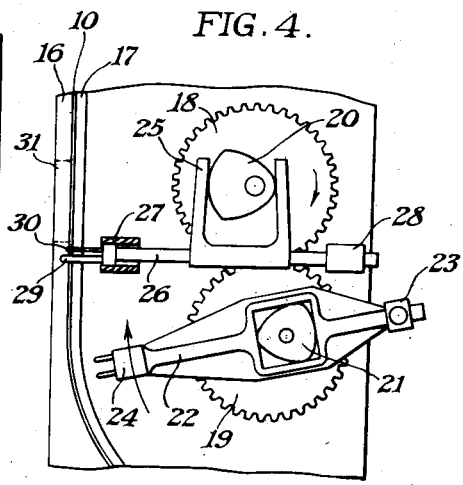
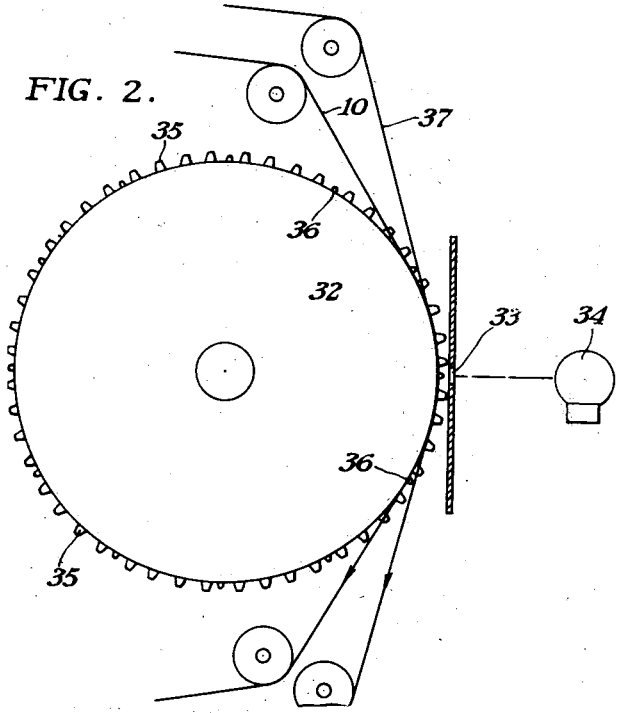
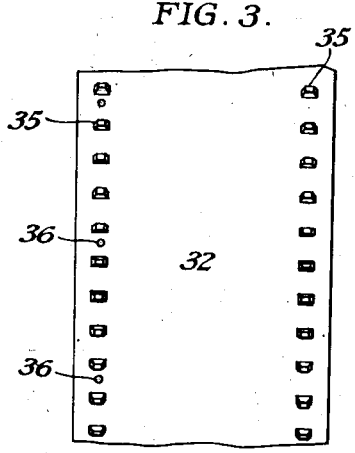
JOHN G. CAPSTAFF
INVENTOR
BY
ATTORNEYS Patented Jan. 8, 1952

2,582,004

UNITED STATES PATENT OFFICE 2,582,004

MOTION-PICTURE SENSITOMETRY

John G. Capstaff, Rochester, N. Y., assignor to Eastman Kodak Company, Rochester, N. Y., a corporation of New Jersey Application October 2, 1947, Serial No. 777,549

6 Claims. (Cl. 95—9)

The present invention relates to motion-picture sensitometry. It relates in particular to sensitized films for motion pictures upon which are provided a series of latent images of a sensitometric strip.

In the making of motion-picture films it is necessary that the final positive prints shall have a particular contrast or gamma, the latter being defined as the ratio of the difference between any two densities on the straight-line portion of the D log E curve and the difference in the logarithms of the corresponding exposures. As is well known to those skilled in the photographic art, the overall contrast of the final positive print is dependent upon the gamma to which the negative is developed and that to which the positive is developed. The gamma is best determined by measurements made on a sensitometric strip which is developed from a latent image at the same time and under the same conditions as the latent picture images on the film, as is well known in the photographic art. Sensitometric measurements have been found to be especially valuable in color photography to effect proper color balance by using sensitometric data obtained from the separation negatives to determine relative exposures and development times.

In the past, the general practice has been to print the sensitometric strip or density wedge on the end of each film band. In some instances a separate strip was attached to the film band and developed together with it. Both practices were open to criticism inasmuch as the motion-picture film band often comprised a number of scenes and after development the film was cut and reassembled. Frequently, these operations resulted in the loss of the sensitometric strip. Moreover, it was necessary to keep sensitometric records of the various portions of a film where such a film was made up of scenes cut from various film lengths.

It has also been found that sensitometric checks are valuable in processing a long film band since the developing conditions may vary during the operation. The use of a single density wedge per film band affords no check on this, however. It has, therefore, been proposed that a number of sensitometric strips be printed at suitable intervals upon a film band itself. Such strips were printed along the perforated edge of the film as disclosed in U. S. Letters Patent 1,762,925, granted June 10, 1930, to L. A. Jones et al. The objection to locating the density wedges along the perforated edge of the film band has been, that due to variations in developing conditions and/or emulsion sensitivity transversely across the film, the developed sensitometric strip is not truly representative of the developed picture area. The variation in developing conditions, which occurs transversely across the film, is believed to be caused in part by the film perforations which set up current in the developing fluid adjacent the film edges as the film travels through the bath, producing a different type of agitation than that to which the central picture areas are exposed. Moreover, it is believed that the various mechanical operations to which sensitized film is subjected in the manufacture of motion-picture film, such as slicing and perforating, result in variations in the film sensitivity along the film edges. It is thus apparent that, in order that the developed sensitometric strip be truly representative of the developed picture area, the latent images of the sensitometric strip be positioned in the same portion of the film as that upon which the picture images are produced.

As is well known to those skilled in the art, the heretofore narrow frame lines separating adjacent picture frames were widened considerably with the advent of sound. It is upon these broad and at present unused frame lines that I print the sensitometric strip images. In this way every picture frame in the length of film will carry a sensitometric strip developed with it under identical conditions. It is obvious, too, that it would be disastrous if the density wedge were imprinted upon the film in the wrong place. To obviate this eventuality, I provide indicia along an edge of the film whereby the location of the latent images of the sensitometric strip may be readily determined.

It is, therefore, an object of the present invention to provide improved motion-picture film having latent images of a sensitometric strip throughout the length of the film.

It is a further object of this invention to provide film of the character described in which the latent images of the sensitometric strip are transversely positioned at intervals throughout the length of the film.

It is a still further object of this invention to provide film of the character described in which the latent images of the sensitometric strip are positioned in areas adapted to serve as frame lines between the picture areas.

It is a still further object of this invention to provide film of the character described in which indicating means are positioned along the edge of the film whereby the location of the latent images of the sensitometric strip may be readily determined.

Other objects and advantages of this invention will become apparent from the following description taken in connection with the accompanying drawing, and it will be understood that many changes may be made in the details of the film shown and described without departing from the spirit of the invention as expressed in the accompanying claims. I, therefore, do not wish to be limited to the exact details shown and described as the preferred form only has been shown by way of illustration.

In the drawing:

Fig. 1 is an enlarged view of a portion of a film band showing sensitometric strip images positioned in the frame lines between picture areas;

Fig. 2 is a diagrammatic view of an apparatus adapted for the printing of sensitometric strip images upon the film band;

Fig. 3 is an enlarged edge view of a portion of the printing sprocket of the apparatus of Fig. 2; and Fig. 4 is a diagrammatic view of a camera pulldown mechanism adapted to properly position the film band, disclosed herein, relative to the exposure gate.

For reasons stated above, the density wedge images, according to this invention, are located upon the film band on the frame lines between consecutive picture areas. The film band 10, illustrated in Fig. 1, includes the usual edge perforations 11 and uniform picture areas 12 separated by the broad frame lines 13. Images of a sensitometric strip or density wedge 14 extend transversely across the film and are positioned in the broad, at present unused, frame lines 13. Thus, every frame in the length of film carries with it a sensitometric strip developed with it under identical conditions. Moreover, the sensitivity of the emulsion upon which the sensitometric strip is printed is as closely identical to that of the area upon which the picture is exposed as is possible. While Fig. 1 illustrates the sensitometric strip image appearing in every frame line, it is obvious that such an image could be printed upon alternate frame lines or at even less frequent intervals throughout the length of the film. However, it is preferred that a density wedge be printed upon each frame line, inasmuch as this entails little or no more effort than would be involved in printing the wedge at somewhat less frequent intervals. The sensitometric strip may be either the step type or that in which the exposure value or density is gradually and uniformly graded from end to end. The sensitometric strip can be exposed on the film in the camera simultaneously with the picture, the camera being modified to project an image of the sensitometric strip upon the frame line, or it can be printed upon the film in the laboratory before the camera exposure. I prefer, however, to print the sensitometric strip upon the film in a separate operation soon after the camera exposure.

Obviously, precautions must be taken to avoid printing the image of the sensitometric strip in the wrong place upon the film. I preclude such a possibility by providing on one side of the film, in addition to the regular film perforations 11, a small additional perforation 15, one for each occurrence of the density wedge image. This perforation 15 is preferably positioned in line with and adjacent to the sensitometric strip, as illustrated in Fig. 1, although obviously, the perforation may be located anywhere along the film edge, it only being necessary that the position of each perforation 15 relative to its respective sensitometric strip image 14 be the same in all instances and that this relative position be known. The supplementary perforations 15 in the film edge will have also other uses. Where the film is of the multilayer variety which is stripped in the processing operations, the perforations 15 will provide means whereby the synchronization of the several films may be preserved at the various registering stations by the use of a synchronizing tooth adapted to engage the perforations 15. These perforations, too, may be employed to indicate which is the sound track side of the film before the latent images are developed. A still further use of the perforations is that they may serve as means for telling whether the film is threaded through an apparatus without twists, this requiring, of course, that the leader film in addition to the regular film bear the extra, small perforations.

As noted above, the sensitometric strip may be printed upon the film either before or after the camera exposure. In either case, it is necessary that the pulldown mechanism of the camera include in addition to the regular positioning pin a smaller synchronizing, positioning pin which engages in the supplementary perforations. Such a device is shown in Fig. 4 by means of which the film is adapted to be intermittently moved downwardly between the aperture plate 16 and the guide plate 17. The pulldown mechanism includes the meshed gears 18 and 19 upon the faces of which are secured, respectively, the cams 20 and 21. The rotation of the cam 21 produces a reciprocating motion of the arm 22, the rear end of which is freely slidable in the pivotally-mounted bearing 23, combined with an up-and-down motion of the claw 24. The rotation of the cam 20, on the other hand, produces through the medium of the bracket 25 a reciprocating motion of the arm 26 to which the bracket 25 is secured. The arm 26 is slidably mounted in bearings 27 and 28 and has at the end thereof a conventional positioning pin 29 which, as is customary, engages in one of the regular film perforations 11 to correctly position the film behind the exposure gate 31 while the claw 24, disengaged from the film, moves upwardly as illustrated in Fig. 4. When the claw 24 reaches the top of its travel, it advances into engagement with the film perforations while the positioning pin 29 is being withdrawn from the film perforation. Thereafter, the film is drawn down by the pulldown motion of the claw. The above-described mechanism is modified to include a smaller positioning pin 30 which is also mounted on the arm 26 and which is adapted to engage in the small additional film perforation 15 when the pin 29 enters the regular film perforation 11. By means of this expedient the film is correctly positioned behind the exposure gate 31 in such a manner that the image of the sensitometric strip, or the frame line on which this image will be later imprinted, is not exposed. The cameraman at present has to see that the regular positioning pin or pins will properly engage the film when threading the camera. With the present invention, he must also take care that the film meshes with the supplementary pin 30.

The image of the sensitometric strip may be printed upon the film before or after the camera exposure on a slightly modified, conventional printer. This printer could resemble the simple sprocket-type printer illustrated in Fig. 2. This printer includes the usual sprocket 32, a printing slit 33 and a source of illumination 34. The sprocket is modified to include besides the usual sprocket teeth 35 a series of smaller, synchronizing teeth 36 along one edge thereof (see Fig. 3). The teeth 35 and 36 are adapted to engage the perforations 11 and 15, respectively, of the film 10 and the similar perforations in the overlying sensitometric negative 37. The latter has transverse images of a sensitometric strip separated by heavy protective densities which shield the picture areas of the film 10. The transverse images of the sensitometric strip on the negative 37 bear the same relation to the small supplementary perforations in the edge of the negative as the latent images of the strip to be printed upon the film 10 bear to the perforations 15.

It is obvious that the design of any number of conventional camera pulldown mechanisms could be readily modified to include the extra synchronizing pin required to register with the perforations 15 to serve the purpose of this invention. It is obvious, too, that any number of conventional printers could be modified for the purpose of printing upon the film images of a sensitometric strip correctly positioned thereon. The devices illustrated in Figs. 2 and 4 are described merely by way of example.

From the foregoing description it will be apparent that I have provided means for obtaining all of the objects and advantages of this invention.

What I claim and desire to secure by Letters Patent of the United States is:

1. A band of sensitized film adapted to receive thereon a longitudinal series of spaced pictures of uniform size, having on said band at intervals throughout its length transverse, latent images of a sensitometric strip, said images comprising an identical pattern of areas of different exposure values and being positioned in the spaces adapted to separate consecutive pictures, and indicia on said film for determining the position of the latent images upon the film.

2. A sensitized film band adapted to receive thereon a series of picture areas separated by broad frame lines, having on said film at intervals throughout its length transverse latent images of a sensitometric strip, said images comprising an identical pattern of areas of different exposure values and being positioned on those portions of the film band adapted to comprise frame lines.

3. A perforated sensitized film band having thereon at regularly spaced intervals transversely extending latent images of a sensitometric strip, said latent images comprising an identical pattern of areas of different exposure values, and indicating means on said film band whereby the location of the latent images upon the film may be determined.

4. A perforated motion picture film having a series of picture areas of uniform size separated by broad, transverse frame lines and transversely extending images of a sensitometric strip at intervals throughout the length of the film, said images comprising an identical pattern of areas of differing densities and being positioned on frame lines.

5. A perforated motion picture film having a series of picture areas of uniform size separated by broad, transverse frame lines, transversely extending images of a sensitometric strip at intervals throughout the length of the film, said sensitometric images comprising an identical pattern of areas of different densities and being positioned on frame lines, and an opening in the film edge for each sensitometric strip image, the position of each opening relative to the sensitometric strip image being identical.

6. A perforated band of sensitized film having areas adapted to serve as picture areas, transversely extending latent images of a sensitometric strip, said images comprising an identical pattern of areas of different exposure values and being positioned between picture areas at intervals throughout the length of the film, and an aperture in the film edge for each of said latent images in a fixed position relative thereto whereby the location of the latent images upon the film may be determined.

JOHN G. CAPSTAFF.

REFERENCES CITED

The following references are of record in the file of this patent:

UNITED STATES PATENTS

| Number | Name | Date |
| --- | --- | --- |
| 1,423,770 | Kucharski | July 25, 1922 |
| 1,903,981 | Coffman | Apr. 18, 1933 |

FOREIGN PATENTS

| Number | Country | Date |
| --- | --- | --- |
| 337,151 | Great Britain | Oct. 30, 1930 |
| 352,471 | Great Britain | June 30, 1931 |